United States Patent [19]

Hudson

[11] Patent Number: 5,061,737

[45] Date of Patent: Oct. 29, 1991

[54] FILLING MATERIAL

[76] Inventor: Gary C. Hudson, 4601 Sulgrave Rd., Richmond, Va. 23220

[21] Appl. No.: 719,976

[22] Filed: Jun. 24, 1991

[51] Int. Cl.$^5$ .................................... C08J 9/00

[52] U.S. Cl. .................................... 521/137; 521/54

[58] Field of Search .................................... 521/54, 137

[56] References Cited

U.S. PATENT DOCUMENTS 3,256,218 6/1966 Knox .................................... 521/54

4,153,764 5/1979 Blount .................................... 521/137

*Primary Examiner*—Morton Foelak

*Attorney, Agent, or Firm*—Kenway & Crowley

[57] ABSTRACT

A filling material for pillows or the like composed of a homogeneous mixture of polyurethane foam chips and lengths of polyester fiber. The foam chips may constitute 70 to 50 percent and the fiber lengths may constitute 30 to 50 percent of the mixture. The foam may have an indent load deflection of 8 to 20 lbs. and may be in the form of chips one-quarter inch square. The fibers may be of 5 to 15 denier and average two inches in length. The fiber lengths are coated with silicone to slicken their surfaces.

4 Claims, No Drawings

FILLING MATERIAL

This invention relates to filling material for packing or padding pillows, cushions, upholstery, or the like, or for use as a thermal insulation or packing material.

Filling material, especially for pillows, should be lightweight, resilient and flexible, so that it retains its shape and does not become flattened or crushed permanently. It should be soft to provide comfort when used as a head rest, but it should retain its shape so that the filling does not move to one end or the other. It is also desirable that it should be easily cleaned and that it should not deteriorate rapidly with age.

Natural materials such as down, cotton wadding or batting, kapok, horsehair, tow batting and the like have been used in the past for such filling materials, but are now being replaced by latex and synthetics. Flexible foam materials such as foam latex and foam polyurethane have many advantages. However, they do not have the comfort or luxury of down and are unsuitable for thermal insulation. They are also expensive since the material required to fill a given volume is relatively great.

Another much-used filling material, particularly for the cores of pillows, is composed of fibers. Polyester fibers are especially popular, even though they tend to bunch up and create pockets which permit the pillow to "bottom out".

Some efforts have been made to combine foam pieces with fibers, but these tend to "clump" together as the foam pieces become entangled with the fibers. However, the combination of foam pieces with filaments or fibers has shown some promise, and the primary object of the present invention is to capitalize upon the advantages of the combination of materials while avoiding the drawbacks of the individual materials.

SUMMARY OF THE INVENTION

Generally, the objects of the invention are achieved by shredding polyurethane foam of a predetermined density and indent load deflection into chips or roughly square blocks of about average of one-quarter (¼) inch square. The foam chips may be collected in a bag after shredding and fed into a hopper.

At the same time, polyester fiber composed of any fiber-forming substance which is a long-chain synthetic polymer is prepared. Fibers coated or slickened with a finish such as silicone and of average length of about 2 inches are prepared and then mixed in a tumbler with the foam in an average ratio of 60% foam to 40% fiber. The resultant product is a homogeneous fiber-foam filling material which performs well as a pillow core, a filler for comforters, cushions and upholstered items result.

DESCRIPTION OF PREFERRED EMBODIMENT

As noted, the preferred basic materials of which the subject of the invention is composed are polyurethane foam and polyester fiber. The density of the starting foam material is not critical, but foam of a density of 0.8 to 1.3 lbs. per square foot and an indent load deflection (ILD) of 8 to 20 lbs. has proven satisfactory. The ILD of such polyurethane foam is defined as the amount of weight required to reduce a square block of foam of 16"×16 "×4" thickness down to a thickness of 3". Such foam has been commonly used alone with no other materials as filler for pillows in ranges of 0.8 to 1.2 lbs. density and an ILD of about 10 lbs.

The foam is then shredded into chips or roughly square blocks of about one-eighth to one-half inch per side. Desirably, the average chip or block is about one-quarter inch square. The shredding is accomplished in a conventional foam shredding machine, the foam chips are collected in a bag and placed in a hopper.

Polyester fiber is prepared at the same time. The fiber-forming material may be any long-chain, non-cellulosic synthetic polymer. The fibers should have certain qualities, including 15 crease resistance, quick-drying capabilities, shape retention, high strength and abrasion resistance.

As to size, the diameter of the fiber is not critical but a diameter of 5 to 15 denier, averaging about 6 for use with the average quarter-inch foam chips has performed well. Finally, it should be coated or slickened with a finish such as silicone. In addition to enhancing washability, resilience, and durability, the slickened fibers are capable of limited movement relative to themselves and to the foam chips.

For use with the average quarter-inch foam chips, fiber of 1.25 to 3 inches in length, averaging about 2 inches, has proven superior. The fibers are mixed with the foam chips in a ratio of 30% to 50% fiber to 70% to 50% foam (averaging 60% foam to 40% fiber) in a tumbler to produce a homogenous fiber-foam material for filling pillow cores, comforters, upholstered items and the like. The length and diameter of the fibers relative to the size of the chips plus the limited movement facilitated by the slickened surface of the fiber affords the user a feeling of comfort while maintaining shape and providing adequate support.

Fiber suitable to be prepared for use in the invention is available commercially under various trade names, such as FILWELL II, which is a solid polyester fiber of 6 and 15 denier slickened with silicone, or FILWELL III, which is a hollow polyester fiber of 6, 8, 12 and 15 denier slickened with a silicone coating. The manufacturer of these fibers is Wellman, Inc. of Johnsonville, S.C. Similar fibers are available from several manufacturers, including E.I. duPont de Nemours & Co. of Wilmington, Del.

Pillows having blown cores of fiber/foam in accordance with the invention are hypo-allergenic, provide adequate support without "bottoming out", and are extremely comfortable. In addition to pillow cores, the fiber/foam of the invention serves as an excellent cushioning material for comforters, upholstered cushioning, and accessory cushioning members.

What is claimed is:

1. Filling material for pillows or the like consisting of a homogeneous mixture of 70 to 50 percent of polyurethane foam chips averaging about one-quarter inch square and 30 to 50 percent polyester fiber averaging about two inches in length, said fibers being coated with silicone.

2. Filling material for pillows as defined in claim 1, said fiber being of a denier from 5 to 15.

3. Filling material for pillows as defined in claim 1, said foam having an indent load deflection of 8 to 2 lbs.

4. Filling material for pillows comprising a homogeneous mixture of approximately 60 percent foam and 40 percent fiber in which said foam is composed of polyurethane having an indent load deflection of approximately 10 lbs. and is in the form of chips averaging one-quarter inch square and said fiber is composed of polyester of approximately 6 denier cut into lengths averaging two inches and coated with silicone.

* * * * *